Sept. 22, 1931.     F. G. HODELL     1,824,545
TREAD MEMBER CONNECTION FOR ANTISKID DEVICES
Filed July 16, 1926
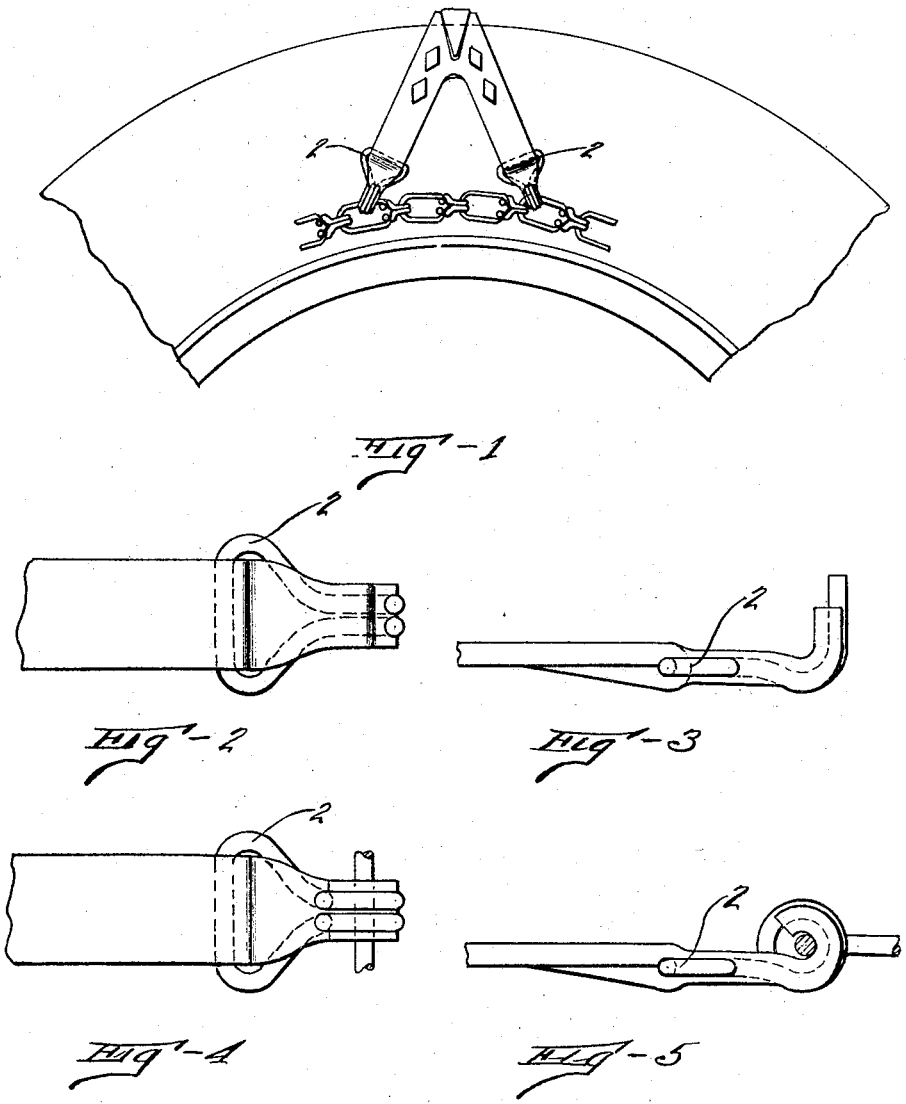
Inventor
Fredrick G. Hodell.
By Brockett + Hyde
Attorneys Patented Sept. 22, 1931

1,824,545

UNITED STATES PATENT OFFICE

FREDERICK G. HODELL, OF CLEVELAND HEIGHTS, OHIO, ASSIGNOR TO THE CHAIN PRODUCTS COMPANY, OF CLEVELAND, OHIO, A CORPORATION OF OHIO

TREAD MEMBER CONNECTION FOR ANTISKID DEVICES

Application filed July 16, 1926. Serial No. 122,930.

This invention relates to non-skid devices of the type particularly in which a number of X-shaped non-metallic tread members are positioned about the periphery of the tire, and secured by connecting devices engaging the tread members and provided with ends looping around adjacent links of the customary side chains.

The side chains commonly employed are formed of wire links. The connecting devices are also formed of wire; and the tread members are of rubber moulded and vulcanized over a fabric base which extends between the connecting devices.

In order to save expense in manufacture as well as weight, it is desirable to form the links and connecting devices of wire of as small a gauge as possible. The type of non-skid device described however, is designed to be tightly secured upon the tire so that the tread members will grip the tread of the tire and it is found that the usual size of link wire, owing to the necessary tension employed with this type of tread member, rapidly wears to a degree unfit for further use.

It is to depreciate this wear that my invention is directed, other advantages of which will appear from the following description taken in connection with the accompanying drawings in which Fig. 1 is a view of a typical section of a tire with a non-skid device of the nature described, in which my invention has been incorporated, applied thereon; Fig. 2 is a detail of an end of one of the tread members showing the connecting device and its relation therewith before assembly upon the side chain; Fig. 3 is a side view of the parts shown in Fig. 2; Figs. 4 and 5 correspond with Figs. 2 and 3 but show the connecting device bent to secure the tread member with the link.

The tread members involved are of the customary generally X-shape and are of tread rubber moulded and vulcanized over a fabric base, although details of construction are not shown in the drawings.

In each end of each tread member is a connecting device 2 formed preferably of wire bent to the shape shown in Figs. 2 and 3, the wire forming an eye as indicated and the ends being bent to an upward position all as indicated in Figs. 2 and 3, the end of the tread member fabric being preferably looped around the eye of the connecting device.

According to my invention I apply the rubber as by molding not only about the fabric of the tread member, but carrying the mold out alongside and overlying the upstanding ends of the connecting device, along the inside of the bend as shown in Fig. 3, allowing sufficient of the rubber, as indicated, to overlie the wire of the device at the sides and between the ends so as to firmly bind or interlock the rubber with the wire.

This form of the overlying portion of the rubber is chosen, so that upon engaging the ends of the connecting device with the side link of the chain and bending around the ends to form an eye to secure the device upon the link as shown in Figs. 4 and 5, the overlying rubber of the tread member will form a wear pad or bearing member, insulating that portion of the connecting device engaging the side chain link from the link.

It has been found that this arrangement serves to greatly decrease the wear upon the parts involved, the intervening rubber also serving to give the entire non-skid device some resilience upon the tire with corresponding quietness. It is in this final form, the connecting device bent around and secured upon the side chain link, that the lateral interlock between the connecting device and the overlying portion of the tread member becomes most effective to prevent lateral motion between the connecting device and the tread member.

What I claim is:

1. In a non-skid device, a non-metallic tread member, a side chain engaging device secured thereto, an upstanding end of said device adapted to be secured upon a side chain link by bending thereabout, a portion of said tread member extending alongside said upstanding end of said device, and adapted upon said bending thereof to lie between said device and a link engaged thereby.

2. In a non-skid device, side chains, non-metallic tread members extending therebetween, connecting devices secured to said tread members and engaging said chains, a portion of said tread members extending between the chain engaging portions of said devices and the chain portions engaged thereby.

In testimony whereof I hereby affix my signature.

FREDERICK G. HODELL.